United States Patent
Caise et al.

[11] Patent Number: 6,105,607
[45] Date of Patent: Aug. 22, 2000

[54] MICROPROCESSOR CONTROLED WATER SHUT-OFF DEVICE

[76] Inventors: Robert F. Caise, 104 Melody La., Naples, Fla. 34114; Howard G. Worthy, III, 241 7th Ave. No., Naples, Fla. 34102; William J. Senkevich, 601 Nottingham Dr., Naples, Fla. 34109

[21] Appl. No.: 09/349,802

[22] Filed: Jul. 9, 1999

Related U.S. Application Data

[63] Continuation-in-part of application No. 09/097,850, Jun. 15, 1998, abandoned.

[51] Int. Cl.[7] .................................................... F16K 31/12
[52] U.S. Cl. .................................. 137/487.5; 137/624.12
[58] Field of Search ................................ 137/80, 624.11, 137/624.12, 487.5; 200/31.9 M

[56] References Cited

U.S. PATENT DOCUMENTS

| | | |
|---|---|---|
| 3,431,375 | 3/1969 | Hotchkiss .................................... 200/82 |
| 4,365,125 | 12/1982 | Keller .................................. 200/81.9 M |
| 4,730,637 | 3/1988 | White .................................... 137/487.5 |
| 4,945,942 | 8/1990 | Lund .................................... 137/624.12 |
| 5,000,224 | 3/1991 | Olson, Jr. et al. .................. 137/624.12 |
| 5,038,820 | 8/1991 | Ames et al. .......................... 137/487.5 |
| 5,056,554 | 10/1991 | White .................................... 137/487.5 |
| 5,090,436 | 2/1992 | Hoch, Jr. et al. .......................... 137/80 |
| 5,162,624 | 11/1992 | Duksa ............................... 200/81.9 M |
| 5,287,884 | 2/1994 | Cohen .................................... 137/487.5 |
| 5,402,815 | 4/1995 | Hoch, Jr. et al. .......................... 138/80 |
| 5,503,175 | 4/1996 | Ravilious et al. .................. 137/624.12 |
| 5,782,263 | 7/1998 | Isaacson, Jr. et al. ............... 137/487.5 |

*Primary Examiner*—Gregory L. Huson
*Assistant Examiner*—Joanne Y. Kim

[57] ABSTRACT

A microprocessor based control system to monitor flow in a potable water system and compare said flow with pre-set programs of time of day and duration of flow, if the pre-set parameters are exceeded the controller will turn off the flow of water.

9 Claims, 6 Drawing Sheets

MICROPROCESSOR CONTROLED WATER SHUT-OFF DEVICE

This application is a continuation-in-part of application Ser. No.09/097,850 filed Jun. 15, 1998,now abandoned.

BACKGROUND

1. Field of Invention

This invention relates to a user programmable microprocessor based automatic water shutoff system that will detect unwanted water flow caused by appliance or plumbing failures, and activate a shutoff valve to minimize damage within a structure from unanticipated flow.

2. Background-Prior Art

Prior art devices of this type have relied on a variety of plumbing, valving and detection systems used to minimize water damage within homes and businesses due to appliance or plumbing system failures. While no device can prevent a leak their purpose is to minimize the damage from such leaks.

Typically, a plumbing leak occurs in situations such as burst pipes due to freeze/thaw cycles, water bearing appliance failures, hose ruptures and other leaks that can go undetected for some time if the property is not occupied during that period. While there are many temperature and moisture sensor based hard wired water shutoff systems such as. U.S. Pat. No. 5,090,436 Hoch issued Apr. 4, 1995 uses hard wired temperature and moisture sensors and requires occupant turn on the system manually when protection is desired. Also requires extensive electrical wiring to fully protect a home from water leakage. Our invention is specifically designed for flow detection and control, typical prior art of this is found in U.S. Pat. No. 5,503,175 Ravillious, issued Apr. 2, 1996 which uses a flow sensor that depends on gravity for return of the piston which may not be reliable in certain water conditions, also the flow sensor is restricted in it's mounting to the vertical position and a control circuit that uses mechanical relays and electromechanical delays and requires human operator action when water is desired, a very cumbersome system to use. Whereas the present invention uses a computer based, all solid state components, user programmable control to pre-program water usage 24 hours a day 7 days a week, for a set and forget system. Another U.S. Pat. No. 5,284,884 Cohen, issued Feb.22, 1994 uses a very complicated microphone sensor system to listen for flow at supply and drain lines, also requires a lot of hard wiring, while this system may overcome some of the shortfalls in the Ravillious sensor, it too falls short, in low flow sensitivity, ambient noise and lack of user programmability. Also U.S. Pat. No. 4,518,955 Meyer, issued May 21, 1985 a very complex flow detection system utilizing a microcomputer to monitor time and flow duration, position of fluid drains in the plumbing system, and other information. This system is over-sophisticated and uneconomical for the average household. U.S. Pat. No. 5,056,554 White issued Oct. 15, 1991 Requires two(2) expensive flow meters to allow fill flow and low flow sensitivity. U.S. Pat. No. 5,038,820 Ames issued Aug. 13, 1991 also as with the Hoch patent it must be turned on and off by the occupant also the Ames system is not fail safe in that if a control or battery fails the water valve stays open.

In conclusion the art is replete with various apparatus with claims to control water leaks. Prior art does not teach of an apparatus that is designed to be user defined for a set and forget 24 hour 7 days a week automatic system that is affordable for the average homeowner. It would be highly advantageous therefore, to remedy the foregoing and other deficiencies inherent in the prior art, and issue letters patent for the present invention.

SUMMARY

A microprocessor based water supply control device that is pre-programmed for water usage for 24 hours 7 days a week and uses a flow sensor to detect fluid flow and compare it to a pre-programmed user defined setting, signal indicators and information output displays on a liquid crystal display panel provide current conditions and program information, a key pad provides for input commands to reconfigure the control parameters. A shutoff status determination by the microprocessor in view of a improper flow activates a solenoid shut-off valve that cant be restored until a manual reset signal is inputted by the user.

OBJECTS and ADVANTAGES

Accordingly, several objects and advantages of our invention are:

(a) to provide a reliable system that will minimize property damage caused by pressure water leaks from appliance or plumbing failures.

(b) to provide a system that is flexible in programming.

(c) to provide a system that is fully automatic after initial install.

(d) to provide a system that is easy to reprogram by the user.

(e) to provide a system that is easy to install.

(f) to provide a system that is economical to install.

(g) to provide a system that requires very little maintenance.

(h) to provide a system that is fail safe ,in case of controller or system failure the water valve will close automatically.

(i) to provide a system that user can manually by-pass the water valve in case of failure of other components.

(j) to provide a system that has low flow sensing ability and still allows for full flow.

While this invention will not prevent leaks such as washing machine over flow hose rupture, dishwasher overflow, toilet tank flooding, etc. It will minimize the amount of damage and flooding by sensing the flow and turning off the water. Still further objects and advantages will become apparent from a consideration of the ensuing description and drawings.

Figure 1:
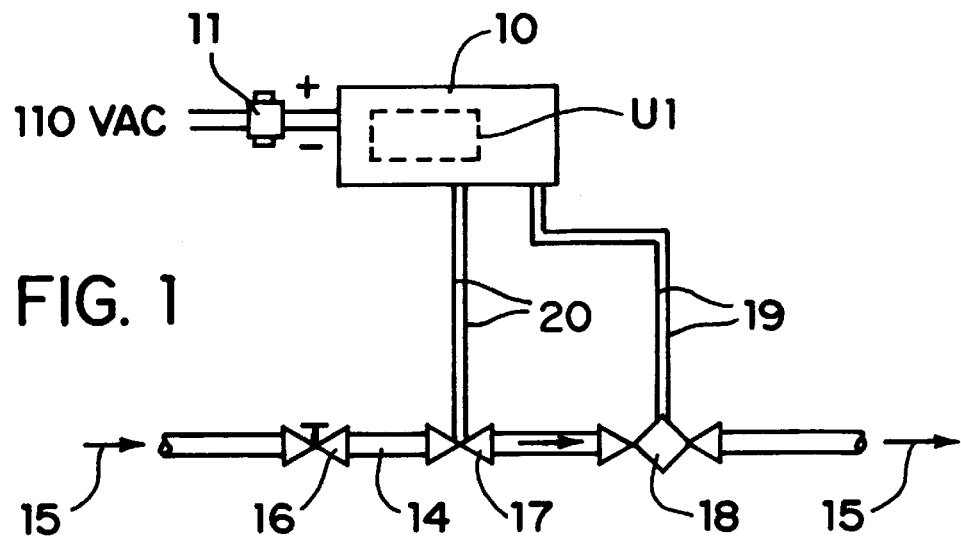
FIG. 1 is a flow and control illustration of the system of the invention.

| REFERENCE NUMBERS used in the DRAWINGS | |
|---|---|
| 10 Main control unit | 11 Step-down transformer |
| 12 not used | 13 12 Volt DC input |
| 14 Water main | 15 Flow direction arrows |
| 16 Manual shut-off valve | 17 Automatic shut-off valve |
| 18 Flow sensor | 19 Data wires |
| 20 Control wires | 21 Valve body |
| 22 Inlet port | 23 Outlet port |
| 24 Valve diaphragm | 25 Upper chamber |
| 26 Spring | 27 A and B Fluid passage ways |
| 28 Outlet chamber | 29 A Solenoid 29B Pilot valve |
| 30 Valve body | 31 Inlet |
| 32 Outlet | 33 Valve seat |
| 36 Leaf spring | 37 Inlet (pressure port) |
| 38 Piston chamber | 39 Magnetic piston |
| 40 Spring (calibration) | 41 Outlet (pressure port) |
| 42 Reed switch | 43 Control head |
| 44 "O"-Ring seals | 45 Terminal strip |
| 46 Terminal strip | 47 Liquid crystal display |
| 48 Terminal strip | 49 Key pad |
| 50 Temperature sensor | 51 Test point |
| 52 Option relay | 53 Option terminals |
| 54 Option terminals | 55 Panic, remote terminals |
| 56 By-pass, remote terminals | 57 Control panel |
| 58 Panic button | 59 Reset button |
| 60 By-pass button | 61 Vacation hold button |
| 62 Day button | 63 Up button |
| 64 Down button | 65 Hour button |
| 66 Minute button | 67 Enter button |
| 68 Program button | 69 Pre-Program button |

DESCRIPTION OF THE PREFERRED EMBODIMENT

Figure 2:
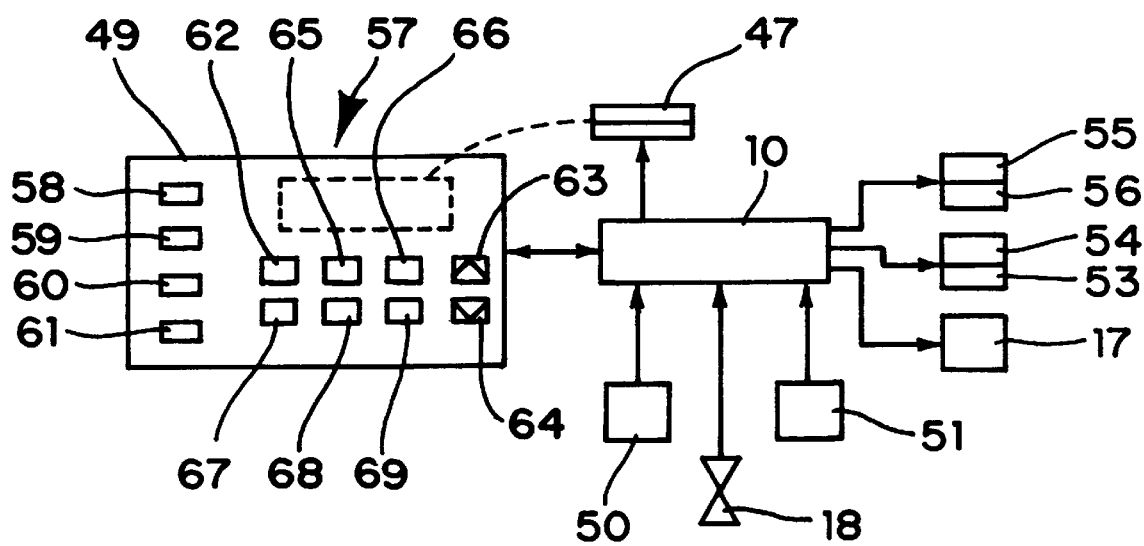
FIG. 2 is an electrical block diagram illustrating the input and output from the system components to the central processor unit.
Figure 5:
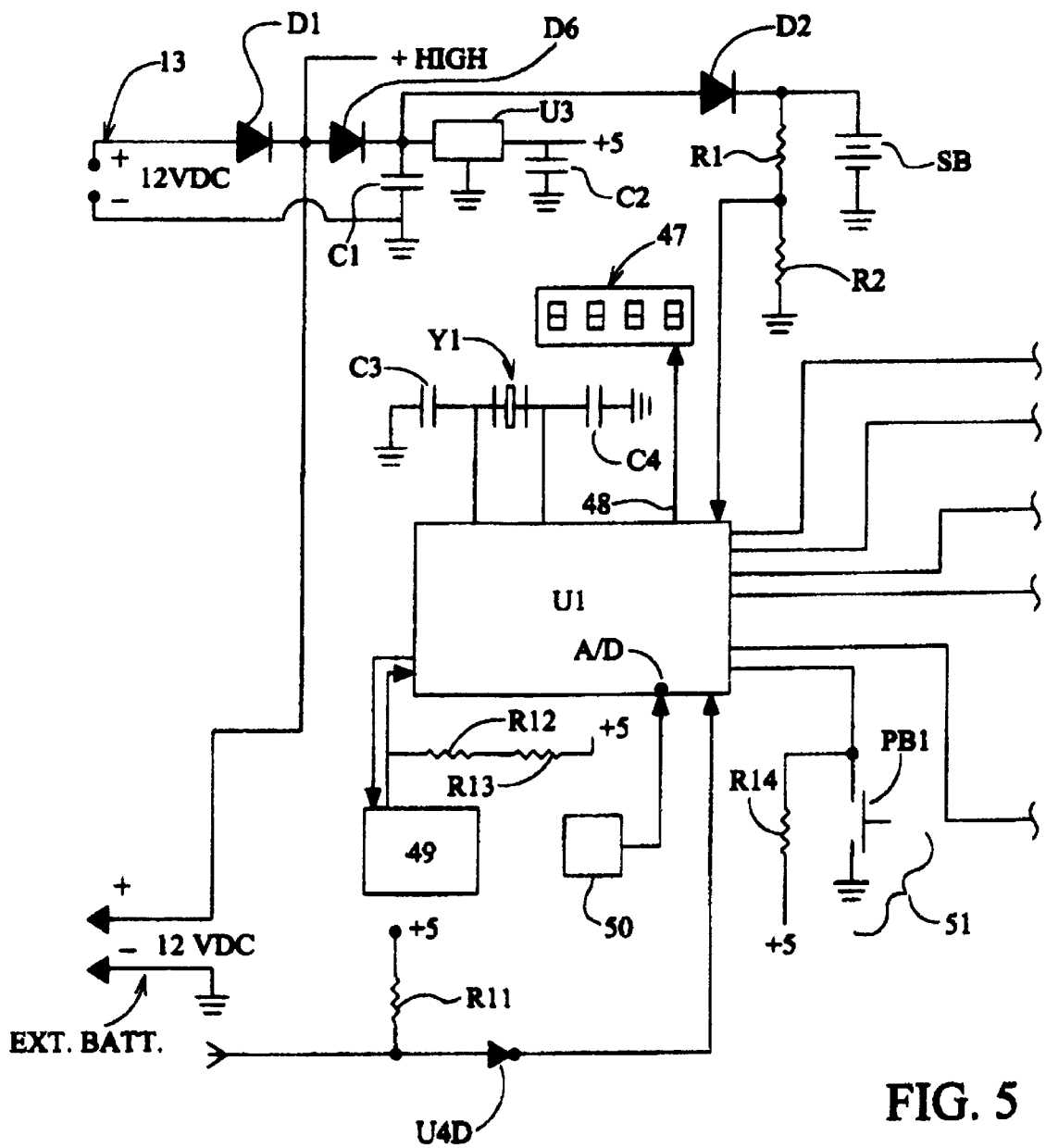
FIG. 5 is an electrical schematic of the controller illustrating multiple input and output control and power sources.

Referring to FIGS. 1, 2 and 5 of the drawings, a fluid flow detection and shut-off system of the invention can be seen for use in residential of commercial structures. The shut-off system of the invention has a main control unit 10 with power supplied by a step down transformer 11 from a live power source of 110 volt AC to a transformer output at 13 of 12 volts DC which supplies the main controller 10 of the system. A water main 14 is illustrated having flow directional arrows at 15 defines the water input to the structure.

In this example, a service line shut-off valve 16, manually operated gate, globe, ball or other type of valve supplied by others according to local plumbing codes this valve is normally open. And an automatic shut-off valve 17 are positioned in series in the water line 14. A flow sensor 18 is positioned downstream of the automatic shut-off valve 17. The flow sensor 18 is electrically connected to the control unit 10 via data wires 19. Correspondingly, the automatic shut-off valve 17 has control wires 20 extending therefrom interconnected with the main controller 10 as will be described in greater detail hereinafter.

Figure 4:
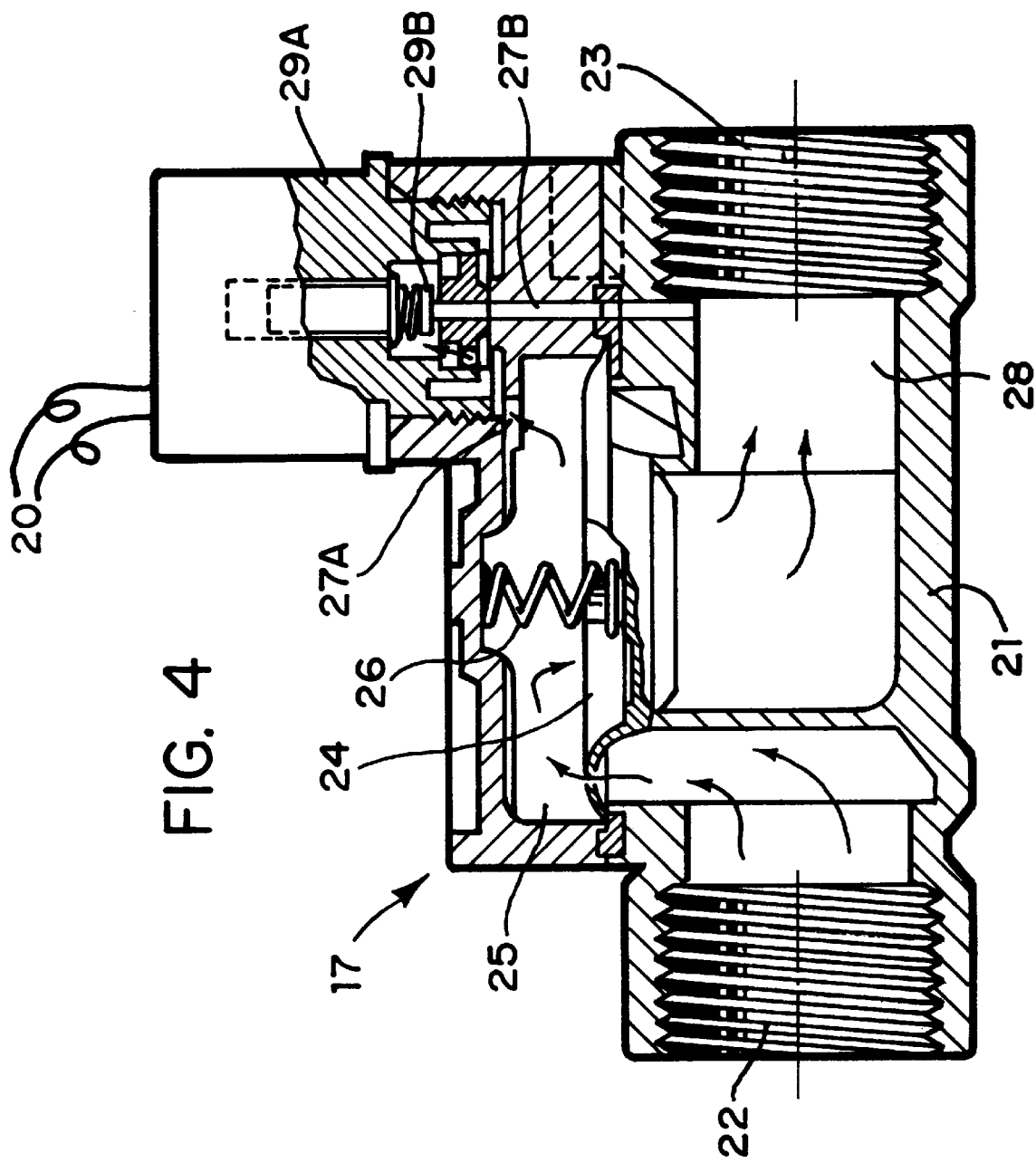
FIG. 4 shows a cross-sectional view of a typical solenoid operated fluid shut-off valve used in the system of the invention.

Referring to FIG. 4 of the drawings, a typical automatic shut-off valve 17 can be seen having a valve body 21 with inlet and outlet ports 22 and 23 respectively. A diaphragm valve element 24 in an upper valve chamber 25 is spring biased by a spring 26 towards a seat position whereby the flow of water from the inlet port 22 to the outlet port 23 is blocked. A fluid passageway 27 communicates between the upper valve chamber 25 and an outlet chamber 28 via a solenoid 29 activated valve element 29A. Such solenoid activated valves illustrated in the preferred embodiment are of the type available through suppliers such as L. R. Nelson Company of Peoria, Ill. and Rainbird of Glendora, Calif. and is well known and understood to those skilled in the art. In operation, the automatic shut-off valve 17 in opening sequence, the fluid passage 27A is opened by activation of the pilot valve 29A lowering pressure through passage 27B from the upper chamber 25 allowing the valve diaphragm 24 to move upwardly in the valve chamber 25 to an unseated position. When the solenoid valve 29A is de-activated upon command of the controller 10 the pilot valve 29A closes thus allowing the diaphragm 24 to be repositioned by the fluid pressure against the valve seat thus shutting off the fluid flow therethrough as is evident from the above referred to description.

Figure 3:
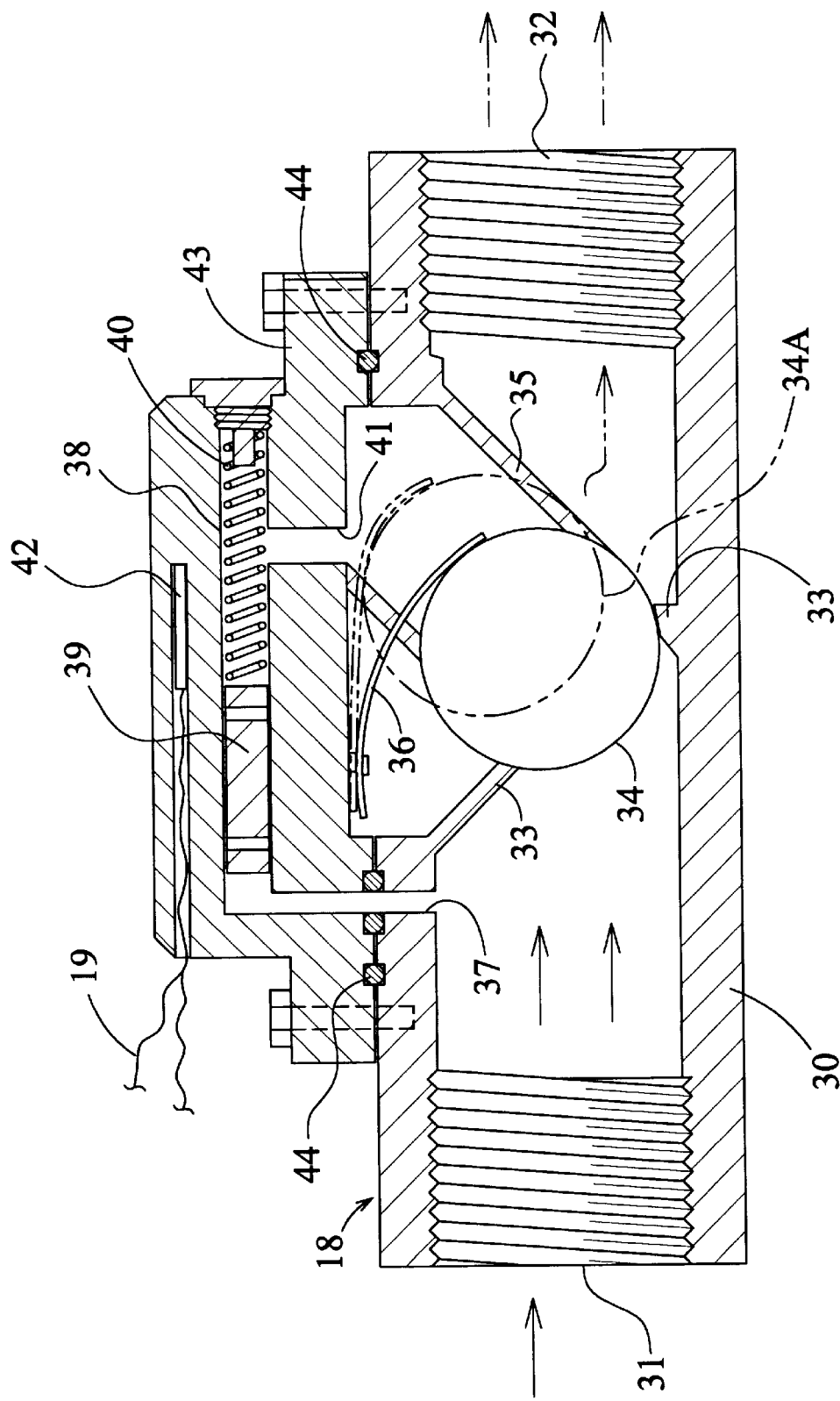
FIG. 3 shows a cross-sectional illustration of the flow sensor device used in the invention.

Referring now to FIG. 3 of the drawings, the flow sensor 18 can be seen having a valve body 30 with an inlet opening 31 and an oppositely disposed outlet opening 32. A valve seat 33 is formed between the inlet and outlet openings with a ball valve element 34 movable within valve guides 35. A leaf type spring 36 extends from the control head 43 and is engageable against the valve ball element 34 urging same into the valve seat 33. A back pressure port 37 upstream of the valve ball element 34 communicates with a chamber 38 having a magnetized piston 39 and a calibrated spring 40. A back pressure outlet port 41 communicates with the chamber 38 allowing for movement of the magnetized piston 39 against the spring 40 when flow occurs indicated by the arrows in broken lines and the ball element position at 34A.

A magnetic reed switch 42 positioned adjacent the chamber 38 within a control head body member 43 secured to the valve body 30 by a plurality of fasteners and interspersed gaskets 44. In operation as flow occurs the ball valve element 34 initially restricts the fluid flow creating back pressure in the port 37 moving the magnetic piston 39 compressing the spring 40 closing the magnetic reed switch 42 which is connected to the main control unit 10 via a wiring harness 19. In response the main control unit 10, recognizes the "flow" signal from the magnetic reed switch 42, compares it with the pre-programmed time and if such condition is met outputs a signal to the solenoid 29 of the automatic shut-off valve 17 closing the valve and stopping all flow of fluid to the system connected thereto. This type of flow sensor gives maximum low flow sensitivity and allows for full flow with minimum flow restriction.

Figure 6:
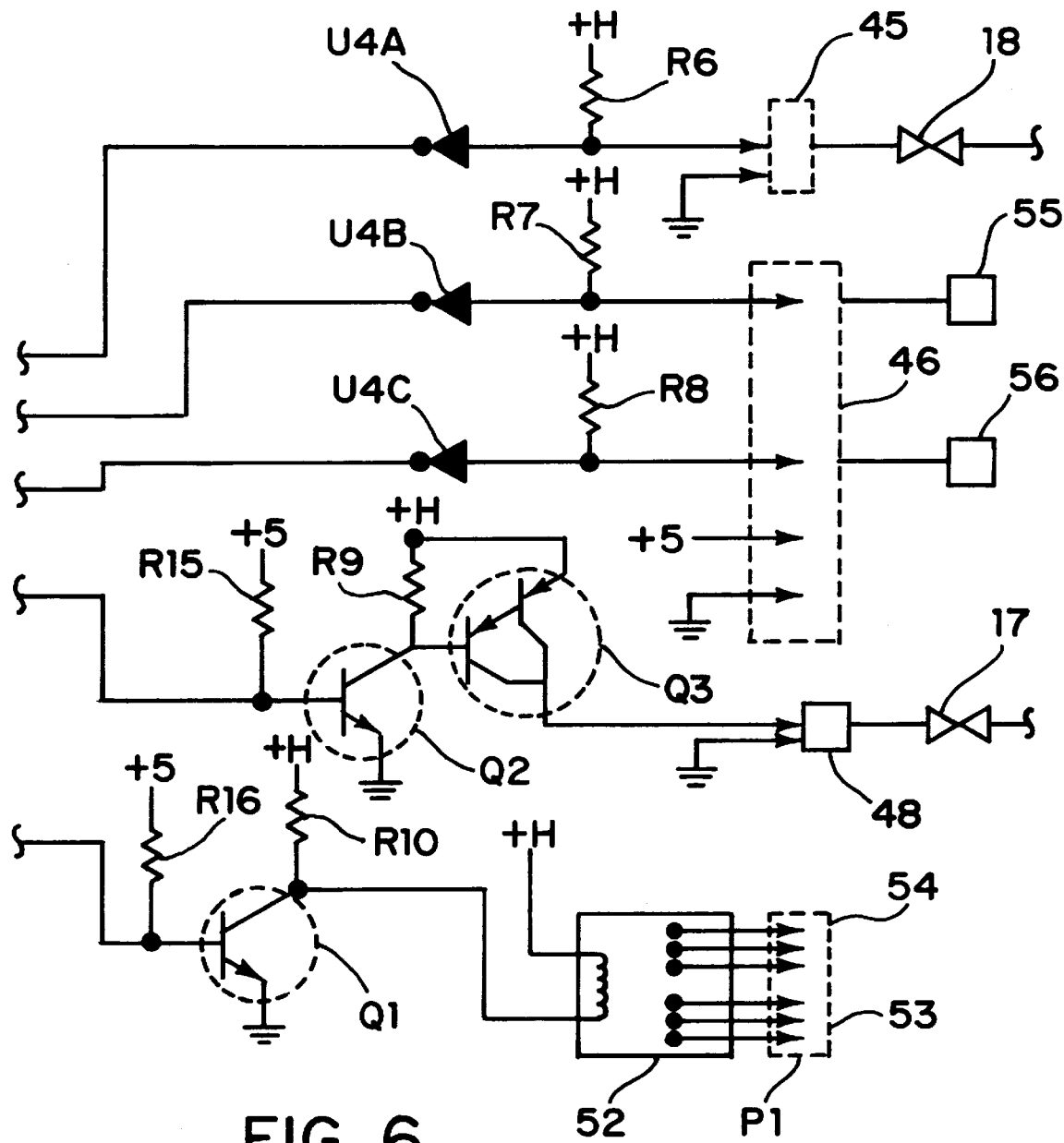
FIG. 6 is a continuation of FIG. 5.
Figure 7:
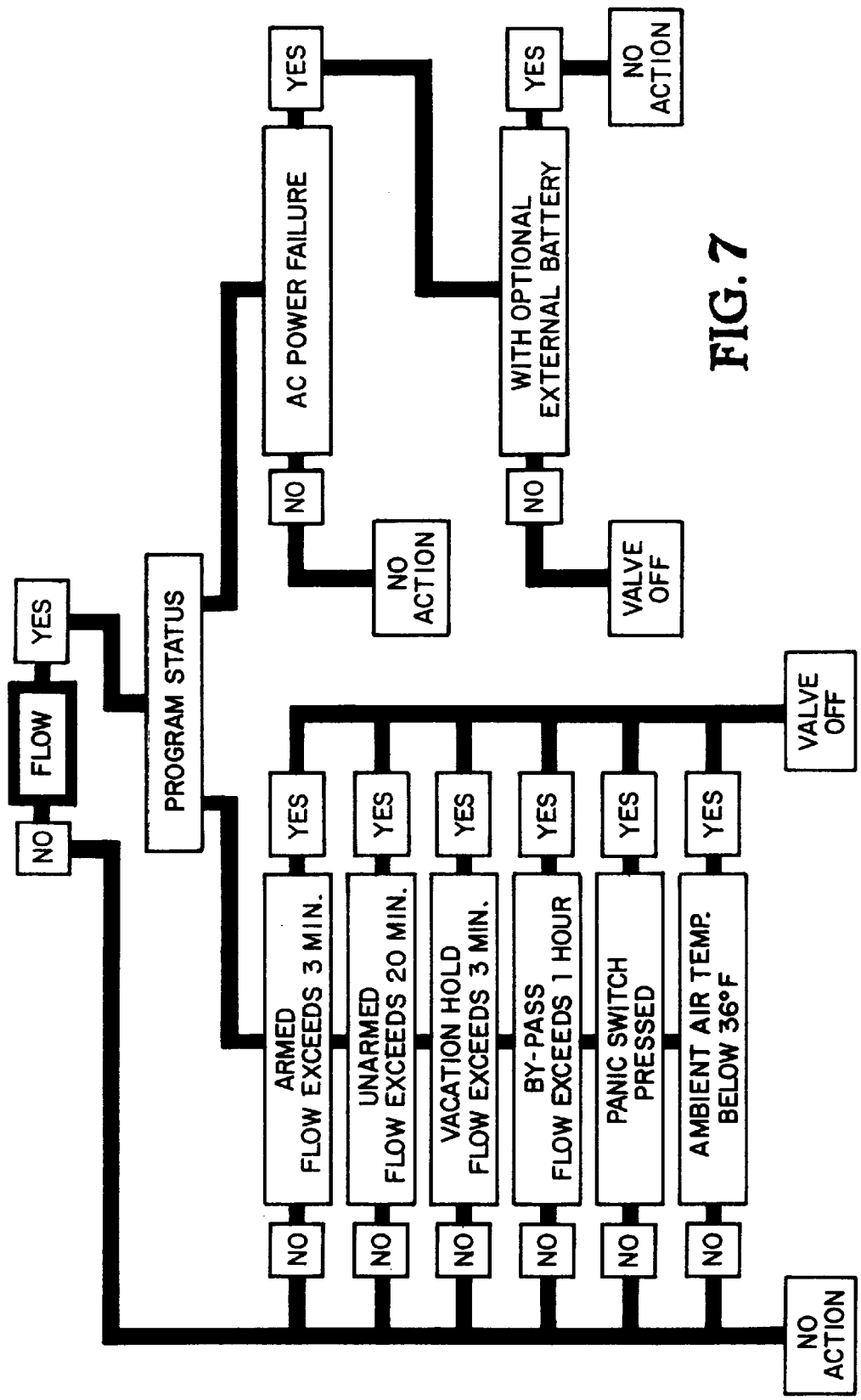
FIG. 7 is a flow chart of operational sequences.

Referring now to FIGS. 5 and 6 of the drawing, a circuit diagram is illustrated showing the preferred form of the invention. Accordingly, power may be supplied to the control system by multiple power sources. The primary power source is the hereinbefore described external 12V step down power transformer 11, best seen in FIG. 1 of the drawings through the power input at 13. An optional external battery (Extbatt) is used to supply power to the system should the main power be interrupted.

Accordingly, the external battery is kept from driving current back into transformer 11 by a diode D1 (1N4148 or equivalent) +high is the high DC voltage used to drive the automatic shut-off valve 17 hereinbefore described. The external battery circuit has a sub-system with a status bit that indicates any external battery problem with input to the microprocessor U1 of the controller 10 through a buffer at U4D. A resistor R11 is a pull-up resistor providing a "no problem" status when the external battery sub-system is not connected.

The +high voltage passes through D6 and is filtered by capacitor C1 and provided to the voltage regulator U3. The voltage regulator U3 generates the +5 volts DC needed by the system logic. The capacitor C2 (representing several capacitors spread across the board) filters the +5 volts DC. U3 may also be supplied by a 9 volt stand-by-battery SB. In this situation, a diode D2 limits charging current into the 9 volt battery when operating from the transformer 11 power.

The resistors R1 and R2 provide a voltage divider of the 9 volt battery output voltage. The divided voltage is monitored by an A/D channel on the microprocessor U1 thereby indicting when the 9 volt battery's voltage gets too low, the microprocessor U1 will alert the user through the display to be described hereinafter. The microprocessor U1 used in this example can be identified by PIC19C924-04 or equivalent needs only power and a clock to operate.

A 32 KHz clock is provided by a crystal at Y1 along with its impedance matching capacitors C3 and C4. All programming accordingly is internal to the microprocessor U1 with a 5 volt DC power supplied as described above.

The system status is indicated by a plurality of icons on the liquid crystal display 47 such as time of day, program, flow, armed or unarmed, day of week, AM, PM, off, low batt. and cold.

The liquid crystal display 47 (LCD) is typically a five digit segmented display with 16 icons. The microprocessor U1 has an LCD controller built into it as will be well understood by those skilled in the art. There are nineteen control lines indicated at 48 between the liquid crystal display 47 and microprocessor U1. When a bit is set in a register in the microprocessor U1 the internal LCD controller drives the appropriate controls to illuminate the corresponding segment or icon in the LCD display at 47.

Such LCD displays 47 are well known in the art and are commercially available. Similarly, membrane push button switches, also called key pads or touch pads 49 are also well known in the art and are commercially available.

In the illustration chosen for the preferred embodiment, additional protection may be added to the system through the use of a temperature sensor 50 typically available as (36GS or the equivalent) attached to an A–D input of the microprocessor U1. The temperature sensor 50 outputs a signal as a voltage increase as the temperature increases. By reading the voltage level the microprocessor U1 knows what the temperature is, based on a pre-programming of the appropriate voltage values in relation to the determination of temperature indicated by the temperature sensor 50. When the temperature approaches freezing, the microprocessor U1 will activate the automatic shut-off valve 17 closing same and LCD will read COLD.

The microprocessor U1 has a test mode input at 51 with a resistor R14 that normally supplies a high signal on this input and the unit will operate normally. If this input is pulled low (by an external device such as a push button PB1) the microprocessor U1 will execute special test and diagnostic software which is pre-programmed. This input is intended for manufacturing and repair or testing the unit, which again is typical within the art of such microprocessors.

The automatic shut-off valve 17 is connected to the system of the invention through two pins (terminals) 48. One pin is ground and the other pin provides +high to the automatic shut-off valve when the automatic shut-off valve is to be turned on. The +high voltage is turned on and off by the microprocessor U1.

When the microprocessor U1 wants to turn on the automatic shut-off valve 17 it drives a high signal to the base of the transistor Q2 in this example (2N3906 or equivalent). A resistor R15 provides additional drive current to Q2. When Q2 turns on it pulls base current from a power transistor Q3 in this example (2N3468 or equivalent) thus turning on Q3 and supplying +high to the automatic shut-off valve 17 solenoid 29. The resistor R9 keeps Q3 turned off when Q2 is off.

There are provisions made for two additional user inputs, such as a remote panic switch 55 and a remote bypass switch 56. These inputs are made through a connector P2 which provides +5 vDC, ground and 2 inputs. Resistors R7 and R8 hold the external input lines high and accordingly the external device would pull the signal lines low (to ground) to indicate that they are active. The input signals are inputted through two gates U4B and U4C and then into the microprocessor U1. The U4 in this example illustrated as (1489 or equivalent) is a rugged input buffer which will tolerate +/−30 vDC input. Also provisions have been made for optional interface with external equipment through connector P1.

This connector serves both normally open and normally closed contact connections. The contact closures are provided by relay 52 with a 2 Form C contact configuration. The relay 52 drive coil is connected to +high and to Q1 (2N3906 or equivalent). When Q1 is turned on by the microprocessor drive current is supplied to relay 52. Resistor RIO guarantees relay coil has no drive current when Q1 is off. Q1 is driven by the microprocessor U1 with R16 providing additional high drive current. These contacts are provided for optional uses, which could be security system interface, audible alarm, water heater and/or water pump lock-out features, or any other uses the owner sees fit.

The flow detection signal 18 is inputted through another gate of the buffer U4 with the signal line accordingly held high by resistor R6 when water is flowing the flow sensor switch 42 pulls the signal line to ground. The signal is buffered by U4A and is inputted to the microprocessor U1 as will be well understood by those skilled in the art.

Referring now to FIG. 2 of the drawings, a block flow diagram can be seen of the system input and output control signals to the microprocessor as hereinbefore described in greater detail and set forth in the hereinbefore illustrated as FIG. 5 of the drawings. It will thus be seen that a control panel 57 combines the key pad 49 and liquid crystal display 47. The key pad 49 has input key functions imprinted thereon to represent functional control access by the user as follows. A panic button 58 is used to manually shut-off the water supply when an unexpected water flow is detected by the occupant.

A reset button 59 allows the system to resume normal operation following the panic button 58 use or automatic activation of the automatic shut-off valve 17 in the water system. A bypass button 60 overrides the current programmed activity within the system for one hour and is used when the user would need to bypass the flow sensing system regardless if the system is armed or not.

A VAC (vacation hold) button 61 is used as a demand program override to arm the system until it is deactivated without requiring reprogramming of the system.

A DAY button 62 inputs the appropriate numerical value of the day of the week with adjustment arrow buttons 63 and 64 for increasing or decreasing said input criteria.

TIME input buttons allow for the hour input at 65, minute input at 66.

An ENTER button 67 enters the selections by the user into the microprocessor 10.

A PROGRAM button 68 is used for setting the desired days and on/off times for the system.

A PRE-PROGRAM button 69 is used to set any one of the three (3) pre-programmed settings for the system which have previously been determined.

This is a SET and FORGET system with user defined programs.

Pre Set System limits are:
Armed (on) maximum of three minutes continuous flow.
Unarmed (off) maximum of twenty minutes continuous flow.
Bypass On: maximum of one hour continuous flow.
Vacation Hold: maximum of three minutes continuous flow.
A typical program for the system could be:

| Monday through Friday: | | Saturday/Sunday: | |
|---|---|---|---|
| unarmed | 6:30 AM | unarmed | 7 AM |
| armed | 8 AM | armed | 11 PM |
| unarmed | 12 PM | | |
| armed | 1 PM | | |
| unarmed | 5 PM | | |
| armed | 11 PM | | |

System can be programmed for up to six (6) on and six (6) off times per day for each of seven (7) days of the week, can be all different or any combination of days the same.

System programs are carry over type, for example, if program is set to arm at 11PM on. Tue.nite and next unarm setting was set for Fri. 8AM the system would be armed for the full duration. This type of flexibility cannot be achieved with the electromechanical timers used on the prior art devices.

It will thus be seen that a new and useful automatic shut-off valve sensing detection and activation system for a fluid distribution system has been illustrated and described and it will be apparent that various modifications may be made therein without departing from the spirit of the invention.

What is claimed is:

1. A water supply shut-off system controlled by a microprocessor, said water supply shut-off system being used in a building structure having a plurality of diverse plumbing devices therein, said water supply shut-off system includes a water supply shut-off valve and a water flow sensing valve, said microprocessor includes means for programming said microprocessor to sense an electronic signal emanating from said water flow sensing valve and means to compare the value of said electronic signal to pre-programmed time durations based upon time of day/day of the week in said microprocessor and to thereafter impress an electronic signal onto said water supply shut-off valve including means for positioning said water flow sensing valve to be oriented in multi-directional positions from the vertical.

2. A water supply shut-off system as claimed in claim 1, wherein said time values are of different durations.

3. A water supply shut-off system as claimed in claim 1 including a manually operated panic switch to activate said shut-off valve when any of said plumbing devices develop an external water leak.

4. A water supply shut-off system according to claim 1 including means for sensing the ambient air temperature close to a point of freezing to shut off said supply.

5. A water supply shut-off system according to claim 1, wherein said water flow sensing valve includes a valve body having an upstream water inlet and a downstream water outlet and a spring biased ball valve placed there between.

6. A water supply shut-off system according to claim 5 including a back pressure inlet in said valve body and positioned upstream of said ball valve and a switch means responsive to fluid pressure in said back pressure inlet generating said electronic signal to said microprocessor.

7. A water supply shut-off system according to claim 1 including an internal battery to continue power to the program status in said microprocessor in case of a main power failure.

8. A water supply shut-off system according to claim 1 including an LCD display on said microprocessor having means to indicate the status of said water supply shut-off system, said LCD also acts as an interface to program said system.

9. A microprocessor for controlling an automatic water supply system having a shut-off valve and a water flow sensing valve, said microprocessor includes a user programmable control means for receiving, comparing and generating electronic signals, said water flow sensing valve sends appropriate electronic signals to said means for receiving in said microprocessor, said means for comparing compares said signals received with a predetermined duration of time and thereafter, the means for generating sends a corresponding signal to said water supply shut-off valve.

* * * * *